(12) United States Patent
Zhang et al.

(10) Patent No.: US 11,685,146 B1
(45) Date of Patent: Jun. 27, 2023

(54) FILM STICKING DEVICE, STAND AND MEMBRANE MODULE

(71) Applicant: Shenzhen MaiGeSaiFu Technology Co., Ltd., Shenzhen (CN)

(72) Inventors: Kaipeng Zhang, Shenzhen (CN); Huansheng Xie, Shenzhen (CN)

( * ) Notice: Subject to any disclaimer, the term of this patent is extended or adjusted under 35 U.S.C. 154(b) by 0 days.

(21) Appl. No.: 17/945,316

(22) Filed: Sep. 15, 2022

(30) Foreign Application Priority Data

Dec. 16, 2021 (CN) .......................... 202123175749.4

(51) Int. Cl.
   *B32B 41/00* (2006.01)
   *B32B 37/00* (2006.01)

(52) U.S. Cl.
   CPC ................................ *B32B 37/0046* (2013.01)

(58) Field of Classification Search
   CPC ...................... B32B 37/0046; B32B 2457/208
   USPC .................... 156/60, 64, 350, 351, 378, 379
   See application file for complete search history.

(56) References Cited

U.S. PATENT DOCUMENTS

| 2012/0126087 A1* | 5/2012 | Curatolo | F16M 13/00 248/346.06 |
| 2015/0277502 A1* | 10/2015 | Witham | H04B 1/3888 269/287 |
| 2019/0047815 A1* | 2/2019 | Kim | C09J 7/00 |

* cited by examiner

*Primary Examiner* — Michael N Orlando
*Assistant Examiner* — Joshel Rivera
(74) *Attorney, Agent, or Firm* — Daniel M. Cohn; Howard M. Cohn (57) ABSTRACT

The present disclosure provides a film sticking device, stand and membrane module. When apply the mobile phone film, the outer protective film of the mobile phone film is pulled out from the film pulling port, and the static electricity generated by the friction after the protective film is separated from the main film and will absorb the dust, so that the final cleaning of the dust can be achieved; Then, directly touch the mobile phone film toward the mobile phone screen through the pressing port of the main cover body to make it stick to the mobile phone screen, which saves time and energy, greatly meets the needs of users, and can be used repeatedly.

20 Claims, 5 Drawing Sheets

FILM STICKING DEVICE, STAND AND MEMBRANE MODULE

TECHNICAL FIELD

The present disclosure relates to a technical field of sticking a mobile phone film, and in particular to a film sticking device, stand and membrane module.

BACKGROUND

In the existing technology, we usually clean the screen of the mobile phone first, and then stick the film. During the filming process, there will be dust falling on the screen of the mobile phone, resulting in the formation of air bubbles after the film is applied, which cannot be squeezed out. Moreover, the entire filming process is very time-consuming and labor-intensive, and it is difficult to meet the needs of users.

SUMMARY

In order to solve the technical problem that the filming effect is poor, time-consuming and labor-intensive, and it is difficult to meet the needs of users, the present disclosure provides a film sticking device, stand and membrane module. The film sticking device, comprising: a base and upper cover.

The base having a position limiting groove adapted to the shape of mobile phone, the mobile phone is placed in the position limiting groove, the mobile phone screen faces upwards.

The upper cover, which comprises a main cover body and a position limiting structure connected with the main cover body, the mobile phone film is laid flat on the main cover body and is detachably connected with the position limiting structure, the main cover body is provided with a pressing port at a position corresponding to the mobile phone film.

The main cover body is hinged with the base, the main cover body has a closed state when covering the base and the main cover body has an opened state when rotating away from the base, the mobile phone film faces the mobile phone screen in the closed state, the main cover body is provided a film pulling port for pulling out a protective film of the mobile phone film between the main cover body and the base when in the closed state.

Furthermore, the position limiting structure comprises two end position limiting groups, the two end position limiting groups are arranged on the main cover body at intervals, the mobile phone film is provided two connecting ends, each of the connecting ends is detachably connected to one of the end position limiting groups respectively; the main film of the mobile phone film is located between the two end position limiting groups and is facing the mobile phone screen when in the closed state; the pressing port is located between the two end position limiting groups.

Preferably, each of the end position limiting groups comprises at least two position limiting protrusions arranged on the main cover body at intervals; wherein, in at least one of the end position limiting groups, the outer profile dimensions of the cross sections of at least one of the position limiting protrusions in at least one of the end position limiting groups are different from the outer profile dimensions of the cross sections of the remaining position limiting protrusions, or the number of position limiting protrusions of the two end position limiting groups is not equal, each of the connecting ends is provided with at least two position limiting ports, and each of the position limiting ports is respectively clamped on one of the position limiting protrusions and tightly matched.

Furthermore, the position limiting structure further comprises a side position limiting group arranged on the main cover body; the side position limiting group, the two end position limiting groups and the main cover body are together formed a mounting groove, the main film of the mobile phone film is located in the mounting groove.

Preferably, the side position limiting group comprises two position limiting strips, the two position limiting strips are respectively provided on the main cover body, and are located on both sides of the mobile phone film.

Furthermore, the position limiting structure further comprises an auxiliary position limiting group provided on the main cover body, the auxiliary position limiting group is located between the two end position limiting groups and corresponds to one of the connecting ends and is close to the main film of the mobile phone film; the auxiliary position limiting group is detachably connected to the connecting end.

Furthermore, the auxiliary position limiting group comprises at least one auxiliary protrusion, and the opposite connecting end is provided with at least one auxiliary position port, each of the auxiliary position ports is respectively clamped on one of the auxiliary protrusions and tightly matched.

Optionally, the auxiliary position limiting groups are provided with two and both are located between two of the end position limiting groups, two of the auxiliary position limiting groups are provided at both ends of the main film of the mobile phone film, and each of the connecting ends is detachably connected to one of the auxiliary position limiting groups.

Preferably, the pressing port is disposed away from the adapter end.

Furthermore, the upper cover further comprises a film pressing tongue, one end of the film pressing tongue is connected to the pressing port of the main cover body, and the other end is a free end, which is transversely provided in the pressing port.

Preferably, the free end of the film pressing tongue is extended away from the adapter end.

Furthermore, the main cover body is provided an accommodating groove, and the position limiting structure is fixed at the bottom of the accommodating groove; the main cover body is provided with an upper film port on a side wall of one end thereof; the upper film port is communicated with the accommodating groove.

The base is provided a holding tank, and the position limiting groove is provided on the bottom of the holding tank; the accommodating groove of the main cover body and the accommodating groove of the base are together formed a film sticking cavity when the upper cover is in the closed state; the side wall of one end of the base is provided a lower film port, and the lower film port is communicated with the holding tank; the upper film port and the lower film port are opposite to each other in the closed state and together formed the film pulling port.

Preferably, the film sticking device further comprises a positioning structure, which is positioned and connected to the main cover body and the base when in the closed state, so that the mobile phone film is aligned with the mobile phone screen.

Optionally, the positioning structure comprises at least one positioning column protrusion from the side of the main cover body and at least one positioning groove is provided on the side of the base; each of the positioning columns is respectively inserted into one of the positioning grooves when in the closed state.

The present disclosure also provides a stand, the stand comprises a support frame and the film sticking device, the upper cover of the film sticking device is provided with a support port, the base is provided with a support groove, one end of the support frame passes through the support port and is inserted into the support groove when the upper cover is turned to the base, and the other end of the support frame is clamped to the outside of the upper cover.

Furthermore, the support frame comprises a first support plate and a second support plate, the second support plate is connected with the first support plate, the width of the first support plate is greater than the width of the second support plate, the second support plate is penetrated through the support port and inserted into the support groove, and the first support plate is clamped on the outer side of the upper cover.

Furthermore, the included angle between the first support plate and the base is θ, and 0°<θ<90°.

Preferably, both sides of the first support plate are respectively provided with film pressing grooves.

The present disclosure also provides a membrane module, wherein the mobile phone film comprises a main film with an adhesive surface, a protective film attached to the adhesive surface of the main film, and a surface film attached to the surface of the main film opposite to the protective film.

The film sticking device, stand and membrane module provided by the present disclosure has beneficial effects as follows.

The film sticking device comprises a base and an upper cover, wherein the base is provided with a position limiting groove for preventing the circumferential displacement of the mobile phone, and the position limiting groove is adapted to the shape of the mobile phone; the upper cover comprises a main cover body and a position limiting structure connected with the main cover body, the mobile phone film is laid flat on the main cover body and is detachably connected with the position limiting structure. The main cover body is provided with a pressing port at a position corresponding to the mobile phone film, and the main cover body is hinged with the base. Before the mobile phone film is glued to the mobile phone screen, the mobile phone screen can be cleaned according to the regular filming procedure. The mobile phone film is detachably connected to the position limiting structure to realize the pre-positioning and fixing of the mobile phone film. When the main cover body is turned to the base and closed on the base, it is in a covered state. There is a film pulling port between the main cover body and the base, and the mobile phone film faces the mobile phone screen when the main cover body is in the closed state. When apply the mobile phone film, the outer protective film of the mobile phone film is pulled out from the film pulling port, and the static electricity generated by the friction after the protective film is separated from the main film and will absorb the dust, so that the final cleaning of the dust can be achieved; Then, directly touch the mobile phone film toward the mobile phone screen through the pressing port of the main cover body, in order to make the main film gradually expand the bonding area with the mobile phone screen from the pressing position as the starting position. At the same time, the air between the main film and the mobile phone screen is gradually exhausted, so that the main film is attached to the mobile phone screen, and the film sticking operation can be completed by opening the upper cover. When using the film sticking device to stick the film, the mobile phone screen is in the final action of sticking the mobile phone film, since the upper cover and the base are in a closed state, there is almost a dust-free space between the mobile phone screen and the mobile phone film. Moreover, during the filming process, no dust will fall on the mobile phone screen or the plastic surface of the mobile phone film. After the film is separated from the main film, the static electricity generated by the friction will suck the dust on the mobile phone screen to realize the final cleaning of the dust. It not only realizes the final cleaning of the mobile phone screen, but also effectively prevents the adhesive surface of the mobile phone film from sticking to dust due to the long residence time in the air, which affects the filming effect and effectively shortens the filming time. The operation is simple and convenient, and saves time and effort, thus greatly meeting the user's requirements, and can be used repeatedly.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

| Reference number in the drawings: | | | |
|---|---|---|---|
| film sticking device | 100 | mobile phone film | 200 |
| Base | 110 | upper cover | 120 |
| position limiting groove | 1101 | main cover body | 121 |
| position limiting structure | 122 | pressing port | 1203 |
| film pulling port | 101 | end position limiting groups | 1221 |
| protective film | 210 | main film | 220 |
| surface film | 230 | pulling film | 211 |
| position limiting protrusion | 1222 | position limiting port | 201 |
| side position limiting group | 1223 | position limiting strip | 1224 |
| auxiliary position limiting group | 1225 | auxiliary protrusion | 1226 |
| auxiliary position port | 203 | film pressing tongue | 123 |
| accommodating groove | 1202 | upper film port | 1011 |
| holding tank | 1102 | lower film port | 1012 |
| mounting groove | 1201 | avoidance port | 1103 |
| positioning column | 124 | positioning groove | 1104 |
| Stand | 300 | support frame | 310 |
| support port | 1205 | support groove | 1105 |
| first support plate | 311 | second support plate | 312 |
| film pressing groove | 301 | | |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In the description of the present disclosure, it should be understood that orientation or positional relationship indicated by terms "length", "width", "upper", "lower", "front", "rear", "left", "right", "vertical", "horizontal", "top", "bottom", "inner", "outer" and so on are based on the orientation or positional relationship shown in the drawings, rather than indicating or implying that an indicated device or an indicated element must have a particular orientation, are constructed and operated in a particular orientation, and are therefore not to be construed as limiting the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly include at least one feature. In the description of the present disclosure, the meaning of "a plurality of" is at least two, unless otherwise specified.

In the present disclosure, the terms such as "mounting", "connected", "connected to", "fixed at", and the others should be understood in a broad sense unless expressly stated or limited otherwise; for example, it may be a fixed connection or a detachable connection, or integrated; it can be a mechanical connection or an electrical connection; it can be a direct connection or an indirect connection through an intermediate medium, and it can be the internal connection of the two elements or the interaction relationship between the two elements. For a person having ordinary skill in art, the specific meanings of the above terms in the present invention can be understood according to specific situations.

In order to make the purpose, technical solutions, and advantages of the present disclosure clear, the following further describes the present disclosure in detail with reference to accompanying drawings and embodiments.

Embodiment 1

Figure 1:
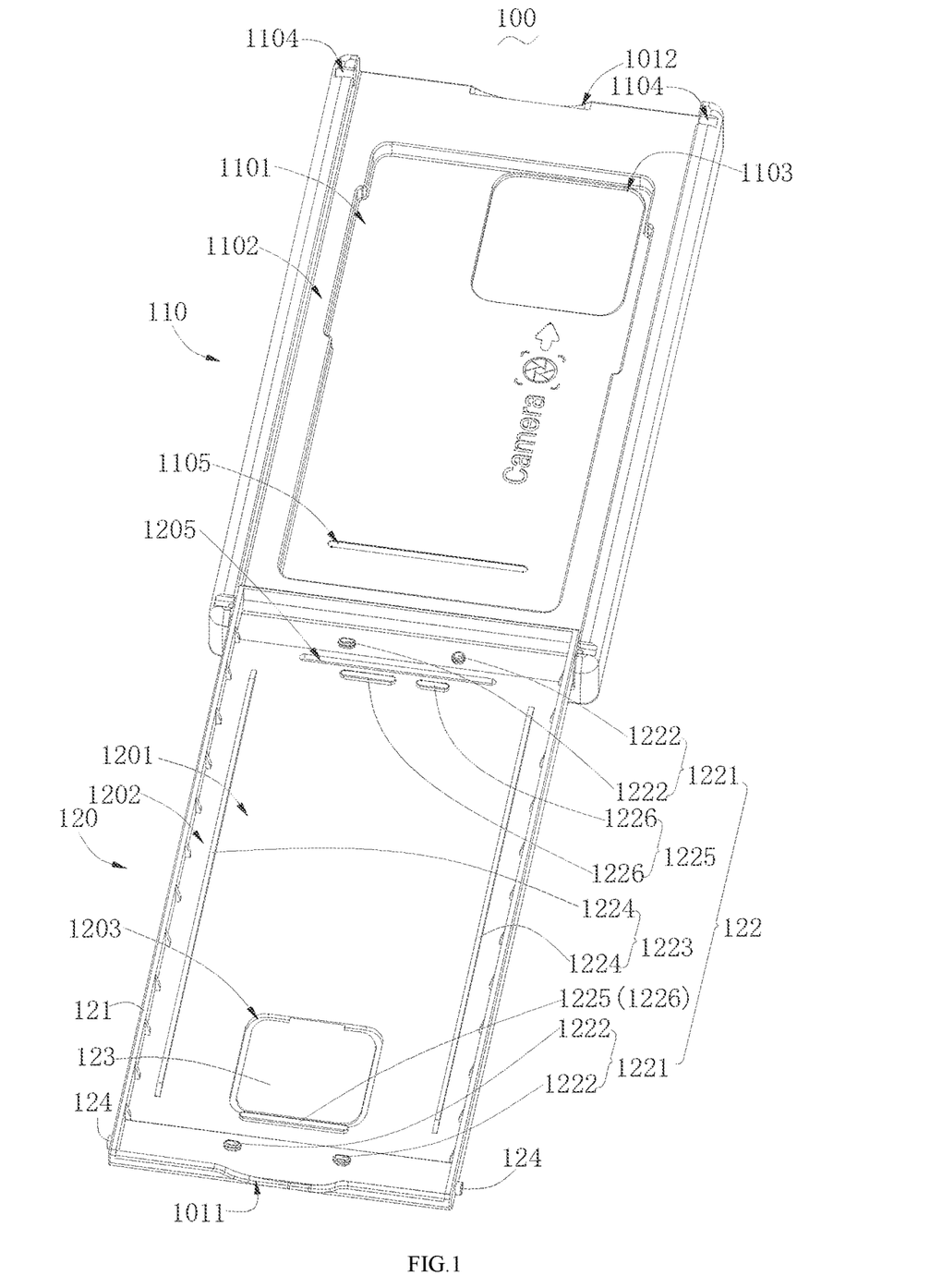
FIG. 1 is a three-dimensional schematic diagram of a film sticking device when is in the opened state according to embodiment 1 of the present disclosure.
Figure 2:
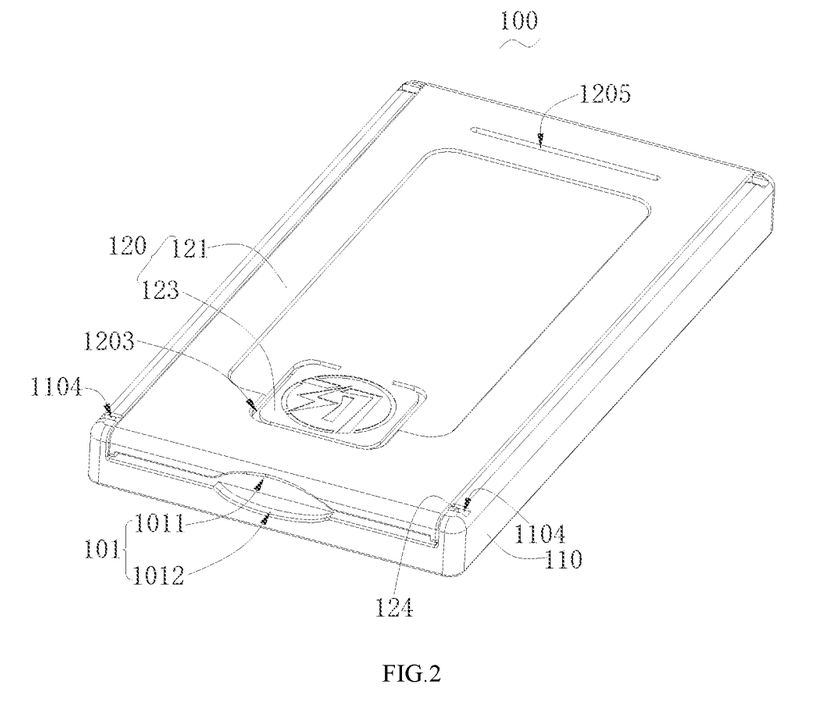
FIG. 2 is a three-dimensional schematic diagram of a film sticking device when is in the closed state according to embodiment 1 of the present disclosure.
Figure 5:
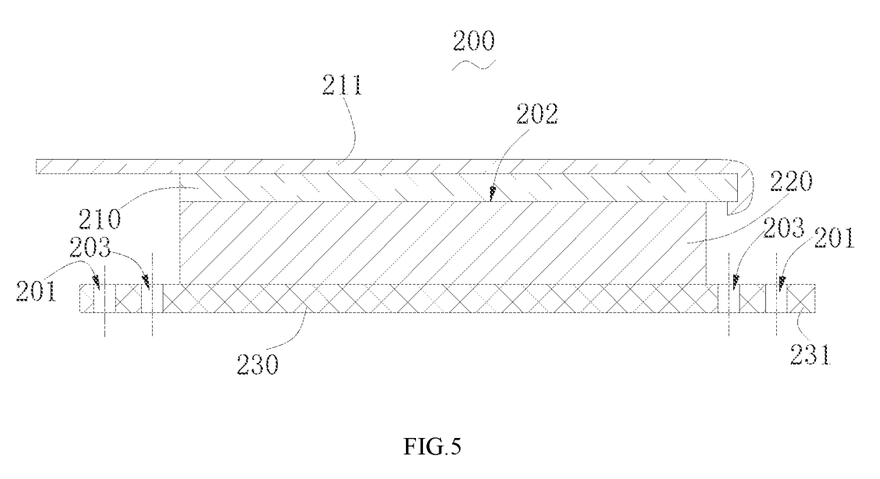
FIG. 5 is an exploded diagram of a mobile phone film according to embodiment 3 of the present disclosure.

Referring to FIG. 1, FIG. 2, and FIG. 5 in the Example 3, the Example 1 of the present disclosure provides a film sticking device 100 for sticking the mobile phone film 200 on a mobile phone screen. The film sticking device 100 comprises a base 110 and an upper cover 120.

The base 110 is provided with a position limiting groove 1101 for preventing the circumferential displacement of the mobile phone. The mobile phone is placed in the position limiting groove 1101, and the position limiting groove 1101 is adapted to the shape of the mobile phone.

The upper cover 120 comprises a main cover body 121 and a position limiting structure 122 connected with the main cover body 121, the mobile phone film 200 is laid flat on the main cover body 121 and is detachably connected with the position limiting structure 122. The main cover body 121 is provided with a pressing port 1203 at a position opposite to the mobile phone film 200.

The main cover body 121 is hinged with the base 110. That is, the main cover body 121 can be rotated relative to the base 110. The main cover body 121 has a closed state when covering the base 110 (as shown in FIG. 2), and the main cover body 121 has an opened state when rotating away from the base 110 (as shown in FIG. 1). The mobile phone film 200 faces the mobile phone screen in the closed state, the main cover body 121 is provided a film pulling port 101 for pulling out a protective film 210 of the mobile phone film 200 between the main cover body 121 and the base 110 when in the closed state.

In the embodiment, the film sticking device 100 comprises a base 110 and an upper cover 120. The base 110 is provided with a position limiting groove 1101 for preventing the circumferential displacement of the mobile phone. The mobile phone is placed in the position limiting groove 1101, and the position limiting groove 1101 is adapted to the shape of the mobile phone. The upper cover 120 comprises a main cover body 121 and a position limiting structure 122 connected with the main cover body 121, the mobile phone film 200 is laid flat on the main cover body 121 and is detachably connected with the position limiting structure 122. The main cover body 121 is provided with a pressing port 1203 at a position opposite to the mobile phone film 200. The main cover body 121 is hinged with the base 110. Before the mobile phone film 200 is glued to the mobile phone screen, the mobile phone screen can be cleaned according to the regular filming procedure. The mobile phone film 200 is detachably connected to the position limiting structure 122 to realize the pre-positioning and fixing of the mobile phone film 200. When the main cover body 121 is turned to the base 110 and closed on the base 110, it is in a covered state. There is a film pulling port 101 between the main cover body 121 and the base 110, and the mobile phone film 200 faces the mobile phone screen when the main cover body 121 is in the closed state. When apply the mobile phone film 200, the outer protective film 210 of the mobile phone film 200 is pulled out from the film pulling port 101. When apply the mobile phone film 200, the outer protective film 210 of the mobile phone film 200 is pulled out from the film pulling port 101, and in order to make the adhesive surface of the main film 220 in the mobile phone film 200 directly face the screen of the mobile phone. Then directly touch the mobile phone film 200 toward the mobile phone screen through the pressing port 1203, in order to make the main film 220 gradually expand the bonding area with the mobile phone screen from the pressing position as the starting position. At the same time, the air between the main film 220 and the mobile phone screen is gradually exhausted, so that the main film 220 is attached to the mobile phone screen, and the film sticking operation can be completed by opening the upper cover 121. When using the film sticking device 100 to stick the film, the mobile phone screen is in the final action of sticking the mobile phone film 200, since the upper cover 120 and the base 110 are in a closed state, there is almost a dust-free space between the mobile phone screen and the mobile phone film 200. Moreover, during the filming process, no dust will fall on the mobile phone screen or the plastic surface of the mobile phone film 200. After the outer of protective film 210 is separated from the main film 220, the static electricity generated by the friction will suck the dust on the mobile phone screen to realize the final cleaning of the dust. It not only realizes the final cleaning of the mobile phone screen, but also effectively prevents the adhesive surface of the mobile phone film 200 from sticking to dust due to the long residence time in the air, which affects the filming effect and effectively shortens the filming time. The operation is simple and convenient, and saves time and effort, thus greatly meeting the user's requirements, and can be used repeatedly.

In this embodiment, the mobile phone film 200 faces the mobile phone screen when the upper cover 121 is in the closed state, and the gap is a space reserved for the protective film 210 of the mobile phone film 200 to be pulled out smoothly.

In the embodiment, the position limiting groove 1101 is set according to the model of the mobile phone.

Referring to FIG. 1, FIG. 2, and FIG. 5 in the Example 3, the position limiting structure 122 comprises two end position limiting groups 1221, the two end position limiting groups 1221 are arranged on the main cover body 121 at intervals, the mobile phone film 200 is provided two opposite connecting ends 231, each of the connecting ends 231 is detachably connected to one of the end position limiting groups 1221 respectively; the main film 220 of the mobile phone film 200 is located between the two end position limiting groups 1221 and is facing the mobile phone screen when in the closed state; the pressing port 1203 is located between the two end position limiting groups 1221.

In the embodiment, the mobile phone film 200 comprises the main film 220 having an adhesive surface 202, the protective film 210 attached to the adhesive surface 202 of the main film 220, and the surface film 230 attached to the surface of the main film 220 opposite to the protective film 210. The main film 220 and the protective film 210 are attached together in sequence to form the mobile phone film 200 as a whole. Wherein, both ends of the surface film 230 protrude to the outside of the main film 220 to form the above-mentioned connecting ends 231, and each of the connecting ends 231 is detachably connected to end of the limiting group 1221, and passes through the surface film 230. The two opposite connecting ends 231 are respectively detachably connected to the limiting groups 1221 at both ends to realize the limiting and positioning of the main film 220, that is, the main film 220 is limited and positioned between the limiting groups 1221 at both ends. When the main cover body 121 is in the closed state, the main film 220 is opposite to the mobile phone screen located in the position limiting groove 1101, and the main film 220 is pressed through the pressing port 1203 to make it stick to the mobile phone screen, the main film 220 and the surface film are always glued together. One end portion of the protective film 210 of the mobile phone film 200 is provided with a pull tongue, or the mobile phone film 200 further comprises a pulling film 211, wherein the pulling film 211 is fixed to an end portion of the protective film 210 away from the film pulling port 101 and spans a side of the protective film 210 opposite to the main film 220, and the other end extends out of the outer edge of the main film 220. When the mobile phone film 200 is fixed on the upper cover 120, the protruding end portion of the pull tongue or the pulling film 211 protrudes from the film pulling port 101 so as to be easily pulled directly outside, and the protective film 210 is curled and pulled out, so that the adhesive surface 202 of the main film 220 is directly opposite to the mobile phone screen, and the main film 220 is attached. During the curling process of the protective film 210, the static electricity generated by friction after the protective film 210 is separated from the main film 220 will suck away the dust on the screen of the mobile phone, so that realize the final cleaning of the dust, and better improve the effect of the mobile phone film, which greatly satisfies the user's needs.

Referring to FIG. 1 and FIG. 5 in the Example 3, each of the end position limiting groups 1221 comprises at least two position limiting protrusions 1222 arranged on the main cover body 121 at intervals; wherein, in at least one of the end position limiting groups 1221, the outer profile dimensions of the cross sections of at least one of the position limiting protrusions 1222 in at least one of the end position limiting groups 1221 are different from the outer profile dimensions of the cross sections of the remaining position limiting protrusions 1222, or the number of position limiting protrusions 1222 of the two end position limiting groups 1221 is not equal, each of the connecting ends 231 is provided with at least two position limiting ports 201, and each of the position limiting ports 201 is respectively clamped on one of the position limiting protrusions 1222 and tightly matched. The outer profile dimensions of the cross sections of at least one of the position limiting protrusions 1222 in at least one of the end position limiting groups 1221 are different from the outer profile dimensions of the cross sections of the remaining position limiting protrusions 1222. It can also be understood that the shape is different, so that the size of the position limiting port 201 of the connecting end 231 is different. When the connecting end 231 needs to be fixed on the end limiting group 1221, the position of the matching position limiting protrusion 1222 can be directly determined by the size of the position limiting port 201, which can be directly installed. After the installation is in place, the main film 220 is directly opposite to the mobile phone screen, and there will be no positive and negative, front and rear alignment errors, and the main film 220 can be accurately positioned and installed.

For example, as shown in FIG. 1 and FIG. 2, the end limiting group 1221 near the film pulling port 101 is composed of two position limiting protrusions 1222, and the cross-sectional dimensions of the two position limiting protrusions 1222 are the same; the end limiting group 1221 near the hinge position is also composed of two position limiting protrusions 1222, and the outer contours of the cross-sections of the two position limiting protrusions 1222 are different in size. In this way, when the mobile phone film 200 is installed on the position limiting structure 122, first, the connecting ends 231 of the position limiting ports 201 with different sizes are opposed to the end limiting group 1221 close to the film pulling port 101. Secondly, according to the different sizes of the end limiting group 1221, the position limiting protrusions 1222 and the matching position limiting port 201 are directly aligned. After the alignment, the precise positioning and alignment of the main film 220 are realized. At this time, the main film 220 is facing the mobile phone screen, to prepare for the filming operation after the execution.

As an alternative solution, the number of the position limiting protrusions 1222 of the limiting groups 1221 at both ends is not equal, and each of connecting ends 231 is provided with at least two position limiting ports 201, and each of position limiting ports 201 is respectively clamped to the position limiting protrusions 1222 and closely matched. In this way, users can directly determine which end limiting group 1221 the connecting end 231 should be installed with according to the number of the position limiting ports 201 and the position limiting protrusions 1222, that is, the main film 220 can be accurately positioned and installed.

Referring to FIG. 1 and FIG. 5 in the Example 3, the position limiting structure 122 further comprises a side position limiting group 1223 arranged on the main cover body 121; the side position limiting group 1223, the two end position limiting groups 1221 and the main cover body 121 are together formed a mounting groove 1201, the main film 220 of the mobile phone film 200 is located in the mounting groove 1201. The side position limiting group 1223 can effectively prevent the main film 220 from shifting left and right, and improve the alignment accuracy with the mobile phone screen.

Specifically, the auxiliary position limiting group 1225 comprises at least one auxiliary protrusion 1226, and the opposite connecting end 231 is provided with at least one auxiliary position port 203, each of the auxiliary position ports 203 is respectively clamped on one of the auxiliary protrusions 1226 and tightly matched.

The auxiliary position limiting groups 1225 are provided with two and both are located between two of the end position limiting groups 1221, two of the auxiliary position limiting groups 1225 are provided at both ends of the main film 220 of the mobile phone film 200, and each of the connecting ends 231 is detachably connected to one of the auxiliary position limiting groups 1225. In this way, the stability of the mobile phone film 200 installed on the position limiting structure 122 is further improved, and at the same time, the positioning accuracy of the main film 220 is further improved.

Referring to FIG. 1, FIG. 2, and FIG. 5 in the Example 3, the pressing port 1203 is disposed away from the adapter end of the main cover body. It can be understood that the pressing port 1203 corresponds to one end of the main film 220. When the film is sticked, a downward pressing force is applied to the main film 220 through the pressing port 1203, so that the main film 220 is sticked on the mobile phone screen, and the main film 220 is attached to the exhaust of the mobile phone screen from one end to the other, with good exhaust effect and high attachment integrity.

Referring to FIG. 1, FIG. 2, and FIG. 5 in the Example 3, the upper cover 120 further comprises a film pressing tongue 123, one end of the film pressing tongue 123 is connected to the pressing port 1203 of the main cover body 121, and the other end is a free end, which is transversely provided in the pressing port 1203. The film pressing tongue 123 can be elastically bent and deformed by an external force. When the film is applied, a downward pressing force is applied to the film pressing tongue 123 so that the main film 220 is adhered to the mobile phone screen.

The free end of the film pressing tongue is extended away from the adapter end of the main cover body, further improving the air exhaust effect between the main film 220 and the mobile phone screen, namely, discharging from one end to the other end.

The main cover body 121 is provided an accommodating groove 1202, and the position limiting structure 122 is fixed at the bottom of the accommodating groove 1202; the main cover body 121 is provided with an upper film port 1011 on a side wall of one end thereof; the upper film port 1101 is communicated with the accommodating groove 1202;

The upper film port 1101 and the lower film port 1012 are opposite to each other in the closed state and together formed the film pulling port 101. When the mobile phone film 200 is fixed to the upper cover 120, the protruding end of the pull tongue or the pulling film 211 is protruded from the upper film port 1011.

In the embodiment, the upper film port 1011 and the lower film port 1012 are provided on the side away from the hinged end.

Referring to FIG. 1, FIG. 2, and FIG. 5 in the Example 3, preferably, the base 110 is provided with an avoidance port 1103 at the bottom of the accommodating groove 1102 for avoiding the mobile phone camera, so as to improve the fit between the back of the mobile phone and the accommodating groove 1102 of the base 110. And also plays a supporting role to ensure the gap between the mobile phone film 200 and the mobile phone screen, so as to effectively improve operation efficiency and save time and effort.

Specifically, the positioning structure comprises at least one positioning column 124 protrusion from the side of the main cover body 121 and at least one positioning groove 1104 is provided on the side of the base 110; each of the positioning columns 124 is respectively inserted into one of the positioning grooves 1104 when in the closed state.

In the embodiment, the main cover body 121 is inserted into the holding tank 1102 of the base 110, and the positioning columns 124 are respectively inserted into the positioning groove 1104 when the upper cover 120 is in the closed state.

In the embodiment, there are two positioning columns 124, which are respectively located on both sides of the main cover body 121 and are disposed away from the hinge ends. Similarly, there are also two positioning grooves 1104, and the positions are corresponding to the two positioning columns 124.

Embodiment 2

Figure 3:
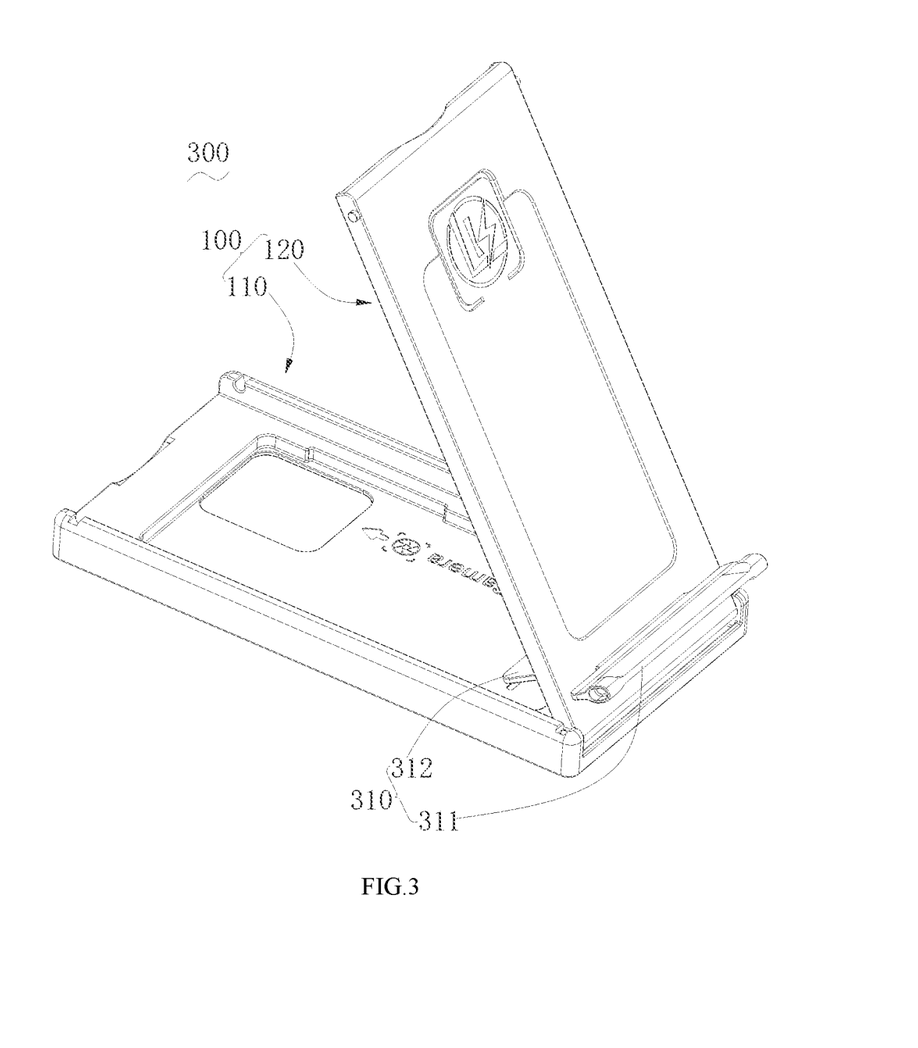
FIG. 3 is a three-dimensional schematic diagram of a stand according to embodiment 2 of the present disclosure.
Figure 4:
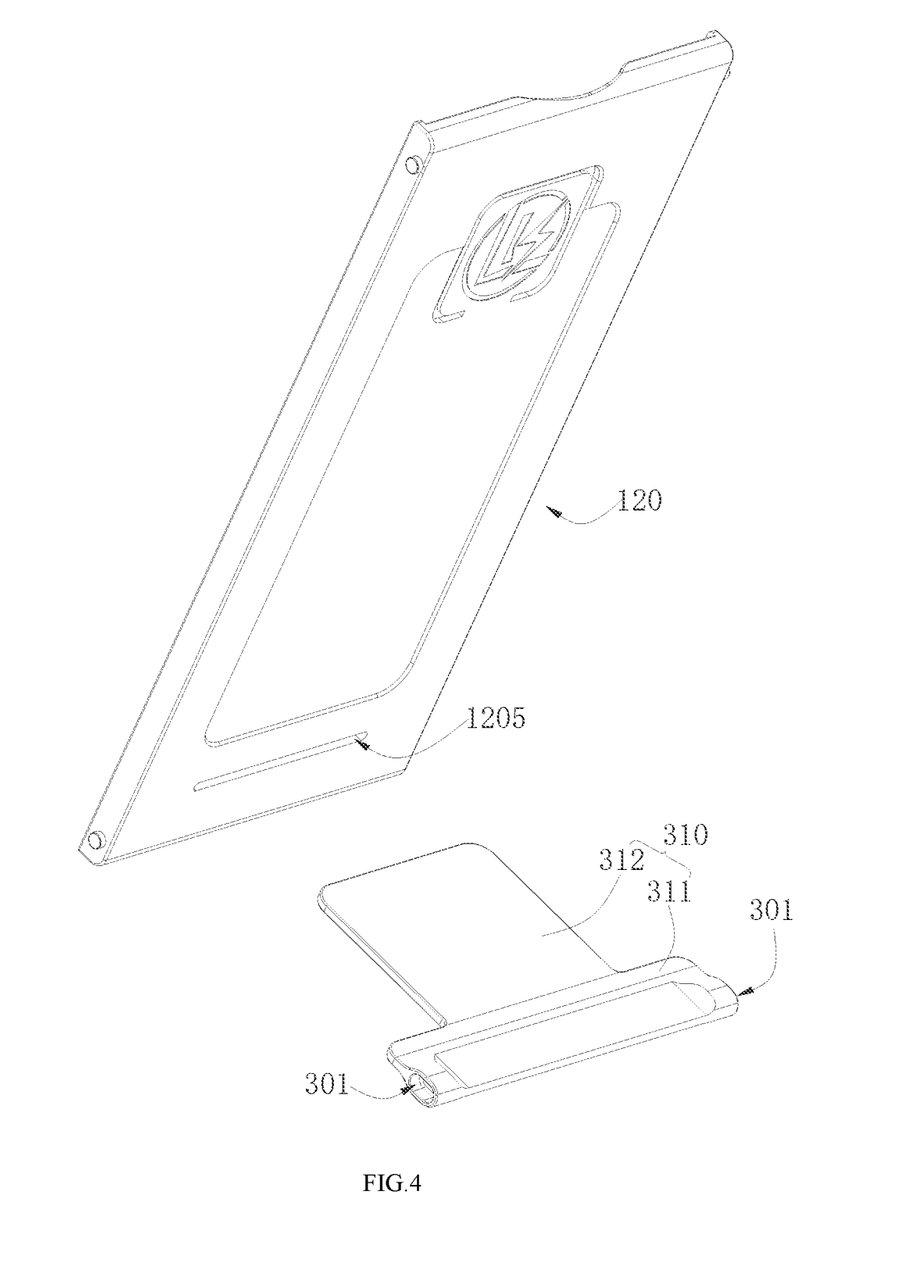
FIG. 4 is a partial exploded three-dimensional schematic diagram of a stand according to embodiment 2 of the present disclosure.

Referring to FIG. 3 and FIG. 4, the embodiment 2 of the present disclosure provides a stand 300, it comprises a support frame 310 and the film sticking device 100 as in the embodiment 1, the upper cover 120 of the film sticking device 100 is provided with a support port 1205, the base 110 is provided with a support groove 1105, one end of the support frame 310 passes through the support port 1205 and is inserted into the support groove 1105 when the upper cover 120 is turned to the base 110, and the other end of the support frame 310 is clamped to the outside of the upper cover 120. The mobile phone or other electronic product can be pressed against the end of the support frame 310 and against the surface of the upper cover 120 to support the mobile phone or other electronic product.

In the embodiment, when the upper cover 120, the base 110 and the support frame 310 are used together, they form a tripod, which has a stable structure and enriches the functions of the film sticking device 100.

In the embodiment, the support frame 310 comprises a first support plate 311 and a second support plate 312, the second support plate 312 is connected with the first support plate 311, the width of the first support plate 311 is greater than the width of the second support plate 312, the second support plate 312 is penetrated through the support port 1205 and inserted into the support groove 1105 of the base 110, it can effectively prevent the second support plate 312 from slipping and moving. And the first support plate 311 is clamped on the support port 1205, used to support mobile phones or other electronic products.

In the embodiment, the included angle between the first support plate and the base is θ, and 0°<θ<90°, which improves the support stability.

In the embodiment, the support frame 310 can also be used as a tool for squeezing air bubbles when sticking the film.

In the embodiment, the stand 300 has a film sticking function, and can also serve as a mobile phone stand.

Both sides of the first support plate 311 are respectively provided with film pressing grooves 301, and the size of each film pressing grooves 301 corresponds to the position limiting protrusion 1222.

When it is necessary to mount the connection end 231 on the end limiting group 1221, each position limiting ports 201 of the connection end 231 is respectively aligned with the position limiting protrusion 1222, and the film pressing groove 301 of the support frame 310 is used to snap onto each position limiting protrusions 1222, so that each of position limiting protrusions 1222 smoothly passes through the position limiting port 201 corresponding thereto, thereby successfully mounting the connection end 231 on the end limiting group 1221, saving time and effort, and achieving an auxiliary mounting effect.

Embodiment 3

Referring to FIG. 5; FIG. 1 and FIG. 2 in the embodiment 1 of the present disclosure provides a membrane module, wherein comprises the mobile phone film 200 for being installed in the film sticking device 100 in the embodiment 1.

The mobile phone film 200 comprises the main film 220 having an adhesive surface 202, the protective film 210 attached to the adhesive surface 202 of the main film 220, and the surface film 230 attached to the surface of the main film 220 opposite to the protective film 210.

When apply the mobile phone film 200, the outer protective film 210 of the mobile phone film 200 is pulled out from the film pulling port 101. When apply the mobile phone film 200, the outer protective film 210 of the mobile phone film 200 is pulled out from the film pulling port 101, and in order to make the adhesive surface of the main film 220 in the mobile phone film 200 directly face the screen of the mobile phone. Then directly touch the mobile phone film 200 toward the mobile phone screen through the pressing port 1203, in order to make the main film 220 gradually expand the bonding area with the mobile phone screen from the pressing position as the starting position. At the same time, the air between the main film 220 and the mobile phone screen is gradually exhausted, so that the main film 220 is attached to the mobile phone screen, and the film sticking operation can be completed by opening the upper cover 121. It not only realizes the final cleaning of the mobile phone screen, but also effectively prevents the adhesive surface of the mobile phone film 200 from sticking to dust due to the long residence time in the air, which affects the filming effect and effectively shortens the filming time. The operation is simple and convenient, and saves time and effort, thus greatly meeting the user's requirements, and can be used repeatedly.

In the embodiment, both ends of the surface film 230 extend from connecting end 231 respectively, and each connecting ends 231 is provided with the above-mentioned position limiting port 201, that is, the connecting end 231 is fixed on each position limiting protrusion 1222. In this way, the fixing effect of the mobile phone film 200 on the upper cover 120 is further improved, and the stability thereof is improved.

When the mobile phone film 200 is fixed on the upper cover 120, the protruding end portion of the pull tongue or the pulling film 211 protrudes from the film pulling port 101 so as to be easily pulled directly outside, and the protective film 210 is pulled out, and the main film 220 is attached.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. A film sticking device, used for sticking a mobile phone film to a mobile phone screen of a mobile phone, the film sticking device comprising:
   a base having a position limiting groove matching a shape of the mobile phone, wherein the mobile phone is operative to be placed in the position limiting groove, and the mobile phone screen faces upwards; and
   an upper cover, which comprises a main cover body and a position limiting structure connected with the main cover body, wherein the mobile phone film is operative to be laid flat on the main cover body and is detachably connected with the position limiting structure, and wherein the main cover body defines a pressing port at a position corresponding to the mobile phone film, wherein the pressing port is configured to allow a user to apply a downward pressure to the mobile phone film in order to stick the mobile phone film to the mobile phone screen, and wherein the pressing port has a smaller size than the mobile phone film and is positioned closer to a width of the mobile phone film than another width of the mobile phone film when the mobile phone film is placed in the main cover body, the pressing port is disposed away from the adapter end of the main cover body, and the pressing port corresponds to one end of the main film;
   wherein the main cover body is hinged with the base, the main cover body has a closed state when covering the base and the main cover body has an opened state when being rotated away from the base, wherein an adhesive surface of the mobile phone film faces the mobile phone screen in the closed state, wherein a side of the main cover body is hingedly connected to a side of the base, and a gap is defined between opposite inside surfaces of the main cover body and the base in the closed state of the main cover body, and wherein a film pulling port is defined between the side of the main cover body and the side of the base that are hingedly connected when in the closed state, and wherein the gap and the film pulling port are jointly configured to allow a protective film disposed on the adhesive surface of the mobile phone film to be pulled out through the film pulling port when in the closed state of the main cover body.

2. The film sticking device of claim 1, wherein the position limiting structure comprises two end position limiting groups, wherein the two end position limiting groups are arranged on the main cover body at intervals, the mobile phone film is provided two connecting ends, each of the connecting ends is detachably connected to one of the end position limiting groups respectively; a main film of the mobile phone film is located between the two end position limiting groups and is facing the mobile phone screen when in the closed state; the pressing port is located between the two end position limiting groups.

3. The film sticking device of claim 2, wherein each of the end position limiting groups comprises at least two position limiting protrusions arranged on the main cover body at intervals; wherein in at least one of the end position limiting groups, an outer profile dimension of a cross section of at least one of the position limiting protrusions is different from an outer profile dimension of a cross section of the remaining position limiting protrusions, or the number of position limiting protrusions is not equal between the two end position limiting groups, each of the connecting ends is provided with at least two position limiting ports, and each of the position limiting ports is respectively clamped on one of the position limiting protrusions and tightly matched.

4. The film sticking device of claim 2, wherein the position limiting structure further comprises a side position limiting group arranged on the main cover body; the side position limiting group, the two end position limiting groups and the main cover body collectively define a mounting groove, the main film of the mobile phone film is located in the mounting groove.

5. The film sticking device of claim 4, wherein the side position limiting group comprises two position limiting bars, the two position limiting bars are respectively provided on the main cover body, and are located on both sides of the mobile phone film.

6. The film sticking device of claim 2, wherein the position limiting structure further comprises an auxiliary position limiting group disposed on the main cover body, the auxiliary position limiting group is disposed between the two end position limiting groups and corresponds to one of the connecting ends and is adjacent to the main film of the mobile phone film; the auxiliary position limiting group is detachably connected to the connecting end.

7. The film sticking device of claim 6, wherein the auxiliary position limiting group comprises at least one auxiliary protrusion, and the opposite connecting end is provided with at least one auxiliary position port, wherein each of the auxiliary position ports is respectively clamped on one of the auxiliary protrusions and tightly matched.

8. The film sticking device of claim 6, wherein the auxiliary position limiting groups are provided with two and both are located between two of the end position limiting groups, two of the auxiliary position limiting groups are provided at both ends of the main film of the mobile phone film, and each of the connecting ends is detachably connected to one of the auxiliary position limiting groups.

9. The film sticking device of claim 1, wherein the pressing port is disposed away from the connecting end of the main cover body connected with the base.

10. The film sticking device of claim 9, wherein the upper cover further comprises a film pressing tongue, one end of the film pressing tongue is connected to the pressing port of the main cover body, and the other end is a free end, which is transversely provided in the pressing port.

11. The film sticking device of claim 10, wherein the free end of the film pressing tongue is extended away from the connecting end of the main cover body connected with the base.

12. The film sticking device of claim 1, wherein the main cover body is provided an accommodating groove, and the position limiting structure is fixed at the bottom of the accommodating groove; the main cover body is provided with an upper film port on a side wall of one end thereof; the upper film port is communicated with the accommodating groove;

the base is provided a holding tank, and the position limiting groove is provided on the bottom of the holding tank; the accommodating groove of the main cover body and the accommodating groove of the base are together formed a film sticking cavity when the upper cover is in the closed state; the side wall of one end of the base is provided a lower film port, and the lower film port is communicated with the holding tank; the upper film port and the lower film port are opposite to each other in the closed state and together formed the film pulling port.

13. The film sticking device of claim 1, wherein the film sticking device further comprises a positioning structure, which is positioned and connected to the main cover body and the base when in the closed state, so that the mobile phone film is aligned with the mobile phone screen.

14. The film sticking device of claim 13, wherein the positioning structure comprises at least one positioning column protrusion extending from a vertical side of the main cover body and at least one positioning notch is defined in a vertical side of the base; each of the positioning columns is respectively inserted into one of the positioning notches when in the closed state.

15. A stand, comprising a support frame and the film sticking device of claim 4, the upper cover of the film sticking device is provided with a support port, the base is provided with a support groove, one end of the support frame passes through the support port and is inserted into the support groove when the upper cover is turned to the base, and the other end of the support frame is clamped to the outside of the upper cover.

16. The stand of claim 15, wherein the support frame comprises a first support plate and a second support plate, the second support plate is connected with the first support plate, the width of the first support plate is greater than the width of the second support plate, the second support plate is penetrated through the support port and inserted into the support groove, and the first support plate is clamped on the outer side of the upper cover.

17. The stand of claim 16, wherein the included angle between the first support plate and the base is θ, and 0°<θ<90°.

18. The stand of claim 16, wherein both sides of the first support plate are respectively provided with film pressing grooves.

19. A membrane module, comprising the mobile phone film for installing on the film sticking device of claim 1, wherein the mobile phone film comprises a main film with an adhesive surface, a protective film attached to the adhesive surface of the main film, and a surface film attached to the surface of the main film opposite to the protective film.

20. The stand of claim 16, wherein both sides of the first support plate are respectively provided with film pressing grooves, and the size of each film pressing grooves corresponds to the position limiting protrusion for snapping onto each position limiting protrusions.

* * * * *